United States Patent
Schuhmann

[11] 3,816,013
[45] June 11, 1974

[54] APPARATUS FOR MOUNTING BEARING ASSEMBLIES

[75] Inventor: Peter Schuhmann, Olching, Germany

[73] Assignee: SKF Industriel Trading and Development Company B.V., Amsterdam, Netherlands

[22] Filed: Feb. 20, 1973

[21] Appl. No.: 333,811

[30] Foreign Application Priority Data
Feb. 24, 1972 Germany.................... 7206850[U]

[52] U.S. Cl................................. 403/368, 308/236
[51] Int. Cl....................... F16c 35/06, B60b 27/06
[58] Field of Search ............ 308/236; 403/366, 368, 403/370, 371

[56] References Cited
UNITED STATES PATENTS
1,116,845   11/1914   Rogers................................ 308/236
1,811,679   6/1931   Volot.................................. 308/236

FOREIGN PATENTS OR APPLICATIONS
920,326   3/1963   Great Britain....................... 308/236

Primary Examiner—Manuel A. Antonakas
Assistant Examiner—Frank Susko
Attorney, Agent, or Firm—Murray Schaffer

[57] ABSTRACT

An apparatus for the fixing of bearing assembly having a conical bore about a cylindrical shaft. A relatively thin walled sheet-like sleeve is provided surrounding the shaft within the inner bore of the bearing. The sleeve is provided with radial outward projections and an annular wedge member is seated therein. The wedge has a conical surface and a cylindrical surface corresponding to those of the bearing and the sleeve. Compression means are provided to act against the frontal end of the wedge and one of the projections to urge the wedge compressively against the conical inner bore.

11 Claims, 3 Drawing Figures

PATENTED JUN 11 1974  3,816,013

APPARATUS FOR MOUNTING BEARING ASSEMBLIES

BACKGROUND OF INVENTION

The present invention relates to apparatus for mounting rotating shafts, axles and the like and in particular to apparatus for mounting rolling bearings having a conical bore which is to be fixed about a cylindrical shaft or the like.

Apparatus for fixedly mounting roller bearings or similar ring shaped annular machine parts on shafts, axles or the like are well known and have come in many forms. For example, one form of mounting a roller bearing on a shaft comprises the use of two coaxially arranged sleeves, one inside the other having conical surfaces or bore faces. The inner sleeve is provided with an axial thread lug on which an adjusting nut is arranged. When the nut is tightened, the two sleeves are compressed against each other and the roller bearing is consequently fixedly secured on the shaft.

In another device wherein a hub such as a roller bearing is mounted on a shaft is well known. In this arrangement the bore of the hub or of the roller bearing is made conical and a tensioning sleeve having a corresponding conical surface and a cylindrical boring is inserted between the conical surface of the hub or roller bearing and the cylindrical outer face of the shaft. On the axial end face of the tensioning sleeve which is of small outer diameter an adjusting nut is treaded. Further, there is known a device which is formed of a cylindrical thin walled inner sleeve. The inner sleeve may be pressed, molded or of other simple form and is not worked as a piece of metal. The sleeve is axially slotted about its circumference in more or less equal segments and is provided with an annular flange-like shoulder adjacent one of its end faces and a screw threading about its outer surface adjacent its other end face. An adjusting nut is screwed over the threaded end so that a spring-like ring segment having a conical outer surface and a cylindrical bore can be secured on the sleeve. In adjusting this device in place, an annular securing plate or washer is inserted between the adjusting nut and the adjacent hub or roller bearing end face.

The known devices are not always effective or sufficient to prevent such defects as the accumulation of rust, corrosion, contact erosion or wear and more importantly to provide a secure fixing of the bearing on the shaft. In the use of slotted or segmented sleeves, it is very likely that the compression thereof by the known means would distort and damage them.

The present invention has as an object the provision of apparatus for mounting machine parts, particularly rolling bearing assemblies, having conical inner bores on cylindrical shafts and the like which avoid the defects of the prior art devices.

It is a further object of the present invention to provide apparatus wherein rolling bearing assemblies of the type described can be securely mounted on cylindrical shafts for conjoint rotation and obviating any possibility of axial slipping.

It is a further object of the present invention to provide apparatus for mounting bearings of the type described, which apparatus may be easily disassembled and removed, and used over again repeatedly.

It is yet a further object to provide simple inexpensive apparatus of the type described which is also easy and economical to install.

These objects, others and numerous advantages will be seen from the following disclosure of the present invention.

SUMMARY OF THE INVENTION

According to the present invention apparatus is provided for the fixing of bearing assembly having a conical bore about a cylindrical shaft comprising a relatively thin walled sheet-like sleeve surrounding the shaft within the inner bore of the bearing. The sleeve is provided with radial outward projections and an annular wedge member is seated therein. The wedge has a conical surface and a cylindrical surface corresponding to those of the bearing and the sleeve. Compression means are provided to act against the frontal end of the wedge and one of the projections to urge the wedge compressively against the conical inner bore.

The compression means may take several forms. In one instance it may comprise a resilient spring and in others split rings having screw adjusting means.

Full details of the present invention are set forth in the following description and are shown in the accompanying drawings.

DESCRIPTION OF THE INVENTION

Figure 1:
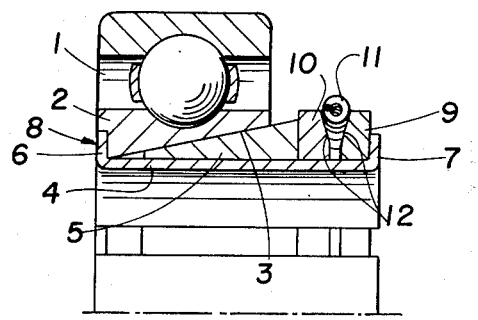
FIG. 1 is a sectional view in an axial plane of a bearing assembly and means for mounting the same showing the present invention.

In FIG. 1 a rolling bearing assembly is shown incorporating the apparatus of the present invention for securing it about a shaft or axle. The shaft is not shown in order to better depict the bearing, however, the same is intended to lie along the central axis of rotation $x-x$. The bearing assembly has an inner race ring 2 which has a conical inner surface or inner bore 3, a more or less conventional outer ring and balls with cage.

Between the conical surface 3 and the shaft (not shown), a relatively thin wall cylindrical sleeve 4 and a conical annular wedge 5 are arranged. The cylindrical sleeve 4 is thin walled and formed from unworked sheet material shaped such as by pressing or pinching sheet metal and the like. The sleeve 4 is provided at both axial ends with a radially outward projection or lip 6 and 7, respectively. The projection 6 is slightly smaller than that of its opposite member and lies in an annular slot 8 at the peripheral edge of the inner race ring 2. The longer projection 7 is adapted to engage over the axial end of an annular member which is adapted to shove and push the wedge 5 against the conical bore 3 of the inner race ring 2. This device comprises three individual elements, namely a pair of annular rings 9 and 10 adapted to lie next to each other about the outer surface of the sleeve 4 and between the axial end of the inner race ring 2 and the projection 7 and a resilient compression member 11 located on the facing key edges 12 of the rings 9 and 10. The compression member 11 may be an elastic O-ring, a torroidal spring or the like which has a compressive force radially inward toward the central axis of the shaft. The action of the compression member forces the rings 9 and 10 apart and creates an axial movement of the wedge 4 by reaction of all elements between the two projections 6 and 7. Preferably, the cylindrical sleeve 4 and the annular conical wedge 5 are axially slit and cut into segments so that the radially inward force of the compression member 11 would shove the wedge 5 within the bore 3 to such an extent that a secure and non-slip fastening is made between the inner race and the shaft. In this manner the bearing is automatically centered about the axis of rotation, held fast against axial displacement and made conjointly rotatable with it.

Figure 2:
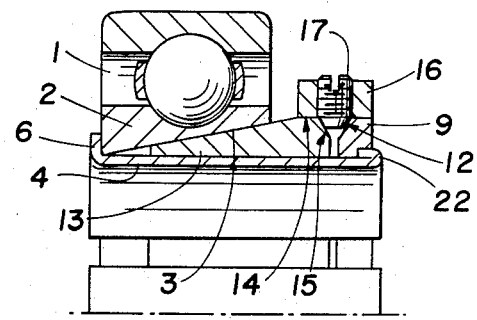
FIGS. 2 and 3 are views similar to that of FIG. 1 showing other examples of the present invention.

FIG. 2 shows another embodiment of the present invention. The rolling bearing is essentially the same as in FIG. 1; like reference numerals being given to like parts. The relatively thin sheet-like sleeve 4 is also similarly formed, except that here the longer radial outward projection 7 is replaced by a flange 22 which is turned a full 180° to lie back on the surface of the sleeve. The bending of the flange 22 over about itself provides an annular projection-like hem about the outer surface of the sleeve 4. Sitting on this hem formed by flange 22 is an annular cylindrical ring 9 which has a conical key-like edge 12. Inserted between the annular ring 9 and the inner race ring 2 of the bearing is an elongated annular wedge 13 having a conical surface on one side and a cylindrical surface on the other, corresponding to the conical surface of the inner race ring and the cylindrical sheet sleeve 4, respectively. Here, the elongated conical wedge 13 is also axially slit or cut into several sections but is provided with an enlarge circumferential cylindrical band 14 at its axial end which is shaped with a key-like edge 15 corresponding to the edge 12 on the ring 9. A retaining ring 16 is shoved over the ring 9 and the cylindrical band 14. The retaining ring 16 is provided with a plurality of uniformly spaced threaded bores about its circumference, in each of which is retained a conically shaped set screw 17. By tightening the set screws 17 in each of their bores, their conical tips enter between the opposed key edges 12 and 15 forcing the annular ring 9 and the wedge 13 apart. As a result, the wedge 13 moves to the left (as seen in the drawings) sliding on the cylindrical surface of the sheet sleeve 4 and compresses within the conical bore 3 of the inner race ring 2.

Figure 3:
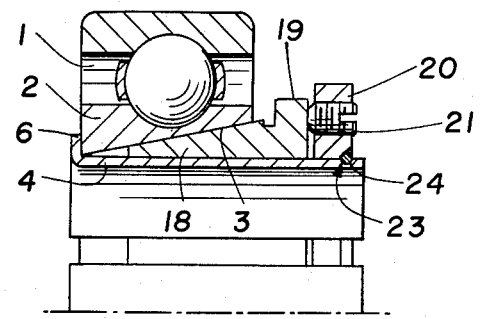

A further example of the present invention is shown in FIG. 3. Here, too, the bearing is the same and the same reference numerals refer to like parts. Lying on the sheet sleeve 4 is a conical wedge 18 having an integral axial end 19 built up and extending radially outwardly to form a wall at its frontal end. The sheet sleeve 4 at this end is not bent into a flange or hem but is axially straight and circumferentially cylindrical. An annular groove 23 is formed within the outer surface of the sleeve 4, in which an O-ring spring or retaining band 24 is lodged, to form the radial projection. A cylindrical ring 20 having an inner conical bore, resting on the O-ring spring 24, is set in opposition to the frontal end of the wedge wall 19. A plurality of threaded holes in which conically tipped set screws 21 are set are arranged uniformly about the ring and axially directed against the face of the wall 19. By tightening the set screws 21, the ring 20 and wedge 18 are forced to move in opposite directions. Because the ring 20 is held by the action of its conical bore on the O-ring spring 24, the wedge 18 is forced to move leftward (as seen in the drawing) into the conical bore of the inner race ring 2.

As is obvious from the drawings and the preceding description, each of the examples provides a simple but effective means for fixing and securing a roller bearing assembly having a conical inner bore about a shaft or axle. The wedge means being partially segmented and having an integral and continuous edge on one side is easily slidable over the sheet-like sleeve inserted over the shaft so that when the wedge is shoved, it securely and definitely locks into place and creates a complete compressive action between the shaft and the conical bore of the bearing assembly. By this means, the bearing assembly is prevented from axial shifting and/or radially slipping with respect to the shaft itself and thereby conjoint movement of the inner race ring and the bearing is effected. While the examples show the present invention as applied to a shaft, it will be obvious that it may equally be used to secure hubs or cylindrical wheel bosses as well as other similar arrangements.

A great advantage of the present invention lies in the fact that the bearing assembly is automatically centered about the shaft or axle and consequently centers the shaft and itself in the machine housing or bore in which it is located. Simultaneously, the bearing assembly is fixed on to the shaft. The creation of corrosion, contact erosion and rust is thereby avoided.

The present invention provides means which is simple to disassemble and which may be used several times. A further advantage lies in the fact that the device may be made as on complete unity which can be packaged and shipped directly from the manufacturer.

Various modifications, embodiments and combinations have been shown, others will be apparent to those skilled in this art. Consequently, the present disclosure should be viewed as being illustrative only and not limiting of the present invention.

What is claimed:

1. Apparatus for mounting a machine part such as a roller bearing assembly having a conical inner bore on cylindrical shafts, axles or the like, comprising a sleeve adapted to be interposed about said shaft within the machine part, said sleeve having retaining means projecting outwardly at the ends thereof, an annular wedge surrounding said sleeve having a conical surface and a cylindrical surface corresponding to the inner bore of the machine part and sleeve respectively, and compression means abutting against the frontal end of said wedge and against one of said radially projecting means to urge said wedge on said sleeve compressively against the conical inner bore when said wedge is interposed between the machine part and said sleeve.

2. The apparatus according to claim 1 wherein said sleeve is made of relatively thin sheet.

3. The apparatus according to claim 1 wherein said wedge is axially slotted along at least a portion of its length.

4. The apparatus according to claim 1 wherein said compression means comprises an annular ring having a plurality of uniformly spaced screw means axially extending thereto into abutment with the frontal end of said wedge.

5. The apparatus according to claim 1 wherein the compression means comprises three elements, a pair of ring elements arranged next to each other between the frontal end of said wedge and said one projection, said ring elements having facing key edges, and a means located within said key edge to force said elements apart.

6. The apparatus according to claim 5 wherein one of said ring elements is integral with said wedge.

7. The apparatus according to claim 5 wherein said means is an annular spring.

8. The apparatus according to claim 5 wherein said means is a set screw.

9. The apparatus according to claim 5 including a retaining ring surrounding said ring elements, said ring having a plurality of uniformly spaced set screws radially extending between said pair of elements.

10. The apparatus according to claim 1 wherein said retaining ring comprises an O-ring set within a groove formed on said sleeve.

11. The apparatus according to claim 1 wherein said sleeve is provided with integrally formed radially outward projections at each end.

* * * * *